United States Patent
Kelley

(10) Patent No.: US 9,406,417 B2
(45) Date of Patent: Aug. 2, 2016

(54) METHODS OF MANUFACTURING WIRE, MULTI-LAYER WIRE PRE-PRODUCTS AND WIRES

(71) Applicant: General Cable Industries, Inc., Highland Heights, KY (US)

(72) Inventor: Frederick J. Kelley, Lexington, MI (US)

(73) Assignee: General Cable Industries, Inc., Highland Heights, KY (US)

(*) Notice: Subject to any disclaimer, the term of this patent is extended or adjusted under 35 U.S.C. 154(b) by 273 days.

(21) Appl. No.: 14/106,343

(22) Filed: Dec. 13, 2013

(65) Prior Publication Data

US 2014/0099434 A1  Apr. 10, 2014

Related U.S. Application Data

(62) Division of application No. 13/085,253, filed on Apr. 12, 2011, now Pat. No. 8,822,824.

(51) Int. Cl.

| | |
|---|---|
| H01B 13/14 | (2006.01) |
| B29C 35/04 | (2006.01) |
| B29C 47/88 | (2006.01) |
| H01B 7/04 | (2006.01) |
| B29C 35/06 | (2006.01) |
| B29C 47/00 | (2006.01) |
| B29C 47/02 | (2006.01) |
| B29C 71/02 | (2006.01) |
| B29C 71/00 | (2006.01) |
| B29C 70/88 | (2006.01) |

(52) U.S. Cl.
CPC .............. *H01B 13/141* (2013.01); *H01B 7/04* (2013.01); *B29C 35/04* (2013.01); *B29C 35/06* (2013.01); *B29C 35/065* (2013.01); *B29C 47/0016* (2013.01); *B29C 47/025* (2013.01); *B29C 47/88* (2013.01); *B29C 47/8805* (2013.01); *B29C 70/88* (2013.01); *B29C 70/885* (2013.01); *B29C 71/02* (2013.01); *B29C 2071/0018* (2013.01)

(58) Field of Classification Search
None
See application file for complete search history.

(56) References Cited

U.S. PATENT DOCUMENTS 3,479,446 A   11/1969  Amaudin, Jr. et al.
3,532,783 A * 10/1970  Pusey .................. B29C 47/0016
                                              174/102 R (Continued)

FOREIGN PATENT DOCUMENTS

| JP | 56-011248 A | 2/1981 |
| JP | 9-115367 A | 5/1997 |

OTHER PUBLICATIONS

Office Action issued in Korean Patent Application No. 10-2013-7029985; dated Nov. 26, 2015; 6 pages, including English translation of Grounds for Rejection.

(Continued)

*Primary Examiner* — Jeffrey Wollschlager
(74) *Attorney, Agent, or Firm* — Ulmer & Berne LLP

(57) ABSTRACT

Exemplary methods for manufacturing a wire and resultant wires are disclosed herein. The method includes extruding a receptor cross-linkable polymer that is substantially free of curing agent about a conductive core and extruding a donor polymer in association with a curing agent. The method includes disposing the donor polymer about the receptor polymer and conductive core to create a multi-layer wire pre-product. The method also includes heat curing a multi-layer wire pre-product to form a wire.

12 Claims, 3 Drawing Sheets

(56) References Cited

U.S. PATENT DOCUMENTS

| | | | |
|---|---|---|---|
| 3,802,913 A | | 4/1974 | MacKenzie, Jr. |
| 3,911,069 A | * | 10/1975 | Fujita .................. B29C 47/0004 264/102 |
| 3,965,226 A | | 6/1976 | Werwitzke et al. |
| 4,005,168 A | | 1/1977 | Whitfill, Jr. et al. |
| 4,075,421 A | | 2/1978 | McCullough |
| 4,132,858 A | | 1/1979 | Anderson et al. |
| 4,138,462 A | | 2/1979 | Procida et al. |
| 4,285,648 A | | 8/1981 | Jocteur |
| 4,457,975 A | | 7/1984 | Bahder |
| 4,469,539 A | * | 9/1984 | Wade ........................ H01B 1/24 156/298 |
| 4,767,894 A | | 8/1988 | Schombourg |
| 5,128,175 A | | 7/1992 | Yamanishi et al. |
| 5,716,574 A | | 2/1998 | Kawasaki |
| 6,359,230 B1 | * | 3/2002 | Hildreth .................. H01B 7/292 174/110 R |
| 7,414,189 B2 | * | 8/2008 | Griess .................. H01B 7/0266 174/110 R |
| 2003/0051900 A1 | * | 3/2003 | Rodway .................. H01B 3/447 174/120 R |
| 2004/0144471 A1 | * | 7/2004 | Sikora .................. B29C 35/0272 156/51 |
| 2006/0182880 A1 | * | 8/2006 | Gitschner .............. H01B 13/14 427/117 |
| 2007/0221395 A1 | * | 9/2007 | Hase ...................... H01B 7/295 174/120 SR |

OTHER PUBLICATIONS

Wada, Zaita; Notification of Reason(s) for Refusal issued in Japanese Patent Application No. 2014-505181; dated Nov. 24, 2015; 8 pages, including English translation.

Wengeler, Heinz; International Search Report and Written Opinion of the International Searching Authority, issued in International Application No. PCT/US2012/031995; dated as mailed on Nov. 29, 2012; 7 pages.

Cleland, Marshall R., et al.; Electron Beam Crosslinking of Wire and Cable Insulation; Technical Information Series TIS 01812, IBA Industrial White Paper; IBA Industrial, Inc.; Edgewood, NY, USA; 6 pages.

Brown, Karl; "Cost-effective XLPO Automotive Insulation Compound Used in Thin-Wall Applications" presented at Applied Market Information Ltd. (AMI) "Cables 2010" Conference, Cologne; Mar. 9-11, 2010; 21 pages.

International Standards Organization; Road vehicles—60 V and 600 V single-core cables—Dimensions, test methods and requirements; International Standard—ISO 6722, Second edition, Aug. 1, 2006; 44 pages; published in Geneva, Switzerland.

General Motors Corporation; Single-Core Stranded ISO Cable; Worldwide Engineering Standards, General Specification Electrical Function; Feb. 2008; 13 pages.

* cited by examiner

METHODS OF MANUFACTURING WIRE, MULTI-LAYER WIRE PRE-PRODUCTS AND WIRES

This application is a divisional of U.S. patent application Ser. No. 13/085,253, filed Apr. 12, 2011, which is incorporated herein by reference.

TECHNICAL FIELD

The present disclosure refers to exemplary methods for manufacturing wires, as well as to exemplary multi-layer wire pre-products and exemplary wires.

BACKGROUND

The term "wire" as used herein refers to a conductive core, wherein the conductive core is enveloped by at least one insulative layer. The term "wire" as used herein also encompasses cables, or groups of two or more insulated conductive cores.

Wires have been ubiquitous since at least the Industrial Age for all types of electrical applications. These applications include, without limitation, commercial and residential power supply, appliances, computers and personal electronics of all shapes and sizes, vehicles of all types, including fossil fuel-powered and electrically-powered automobiles and recreational vehicles.

Historically, wires were manufactured by a simple heat-curing method. The historical heat-curing method involved feeding a conductive core into an extruder wherein at least one insulative layer was extruded about the conductive core. To form insulative layers using such methods, all starting materials, including cross-linkable polymers and their associated curing agents, were combined in an extruder prior to extrusion. Then, the starting materials were extruded about the conductive core at temperatures ranging from about 80° C. to about 110° C. depending upon the particular materials. Next, the extruded wire pre-product was heat cured at temperatures ranging from about 135° C. to about 155° C. for a length of time to cause sufficient cross-linking in the insulative layer or layers to confer onto the insulative layer or layers the desired properties, including physical, mechanical and/or electrical properties.

Such historical heat-curing methods were efficient and relatively inexpensive. For example, by adding all of the starting materials to the extruder at roughly the same time, manufacturers may have realized a gain in manufacturing efficiency. That is, manufacturers could avoid slowing manufacturing line speeds and could avoid purchasing additional equipment to manage the addition of separate materials at separate times.

However, historical heat-curing methods faced numerous challenges. For example, manufacturers sought to avoid premature cross-linking during extrusion, also known as scorching. Significant scorching could damage extrusion equipment and generate wire that would not meet technical specifications, including physical, mechanical and/or electrical specifications. Accordingly, manufacturers were left to experiment with polymer and curing agent combinations to minimize scorching.

Eventually, technical demands on wire became more sophisticated, and wire produced by historical heat-curing methods failed to satisfy a variety of technical specifications. This occurred in many industries. By way of non-limiting example, in the automotive industry, certain original equipment manufacturers (OEMs) require wire to withstand scrape abrasion such that when a conductive core of a wire has a cross-sectional area of 0.22 mm$^2$ or less, the insulation on the wire remains intact following 150 cycles of abrasion scrapes with a needle having a diameter of 0.45±0.01 mm. Wire manufactured by historical heat-curing methods does not satisfy this standard.

To meet the growing technical demands on wire, manufacturers increasingly turned away from historical heat-curing methods and toward radiation or electron beam (e-beam) manufacturing methods. Indeed, e-beam manufacturing methods remain in use today.

E-beam manufacturing methods typically involve feeding a conductive core into an extruder where at least one insulative layer is extruded about the conductive core. To form an insulative layer, all starting materials for the layer are added to the extruder. Then, the starting materials are extruded about the conductive core. Next, the extruded wire pre-product is collected on a spool before being exposed to radiation. Radiation initiates curing, so curing agents are not typically used in e-beam manufacturing methods.

E-beam manufacturing methods have advantages over historical heat-curing methods. As non-limiting examples, the cross-linking reaction in e-beam manufacturing methods is faster and more uniform, especially for thin wall wires. The e-beam manufacturing methods produce wire that satisfies more challenging technical specifications. As a non-limiting example, e-beam manufacturing methods are more effective at preparing abrasion-resistant wires and ultra thin wall wires with a temperature class rating of Class D (150° C.) or higher.

E-beam manufacturing methods, however, also involve numerous challenges. The equipment is expensive and there are attendant safety procedures and precautions whenever radiation is used in a manufacturing method. These safety efforts can add to expenses and slow manufacturing line speeds. Additionally, e-beam manufacturing methods may be more difficult to use with thick wall wires. This may be because, at commercially acceptable manufacturing line speeds, there is a potential for incomplete penetration of electron beams through a dense polymeric insulative layer or layers. Incomplete penetration can lead to incomplete curing, which in turn can cause wire to fail technical specifications. For example, the insulation of the wires may swell or crack.

Additionally, using e-beam manufacturing methods to form very flexible wire presents challenges. This may be because, to spool extruded wire that is not yet cured (that is, extruded wire pre-product), the insulative layer or layers must be sufficiently hard to avoid becoming misshapen or deformed. Generally, this requires the extruded wire pre-product to have a hardness of about 80 Shore A or higher. After curing, the cross-linked polymer in the wire causes the wire to be substantially harder than the extruded wire pre-product. As a result, wire made by e-beam manufacturing methods can fail to achieve flexibility-related mechanical properties desired for certain industrial applications. By way of non-limiting example, it may be useful to produce a flexible wire having a tensile stress at yield of less than 9 MPa and a tensile modulus at 200 MPa. Wire produced by e-beam manufacturing methods would not be expected to exhibit such mechanical properties.

Accordingly, there is a need for improved manufacturing methods and wires. Efficient and cost effective methods are desired that can produce wires that meet can meet increasingly demanding technical specifications.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an embodiment. Further, the specific examples described herein are not intended to be exhaustive or otherwise limiting or restricting to the precise form and configuration shown in the drawings and disclosed in the following detailed description. Exemplary illustrations are described in detail by referring to the drawings, as follows:

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1:
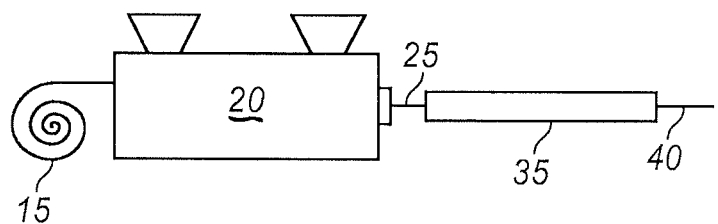
FIG. 1 illustrates an exemplary method of manufacturing wire.
Figure 3:
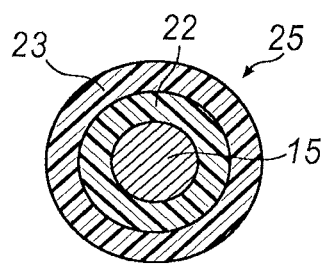
FIG. 3 shows a cross-section of an exemplary multi-layer wire pre-product.

Referring to FIGS. 1 and 3, an exemplary process for manufacturing wires is depicted, as is an exemplary multi-layer wire pre-product 25. Generally, a conductive core 15 is fed into an extruder 20. Monomers, oligomers or polymers to form a cross-linkable receptor polymer 22 are added to a hopper of the extruder 20. No curing agent is added. Separately, monomers, oligomers or polymers to form a donor polymer 23 are added to a different hopper of the extruder 20. Curing agent to be associated with the donor polymer 23 is included in the hopper with the donor polymer 23 and any other starting materials. The receptor polymer 22 is then co-extruded with the donor polymer 23, the donor polymer 23 being associated with a curing agent. A multi-layer wire pre-product 25 is generated from the co-extrusion process. The multi-layer wire pre-product 25 includes the donor polymer 23 disposed about the receptor polymer 22, which is in turn disposed about the conductive core 15. The term "about" as used herein means circumferentially enveloping, but not necessarily in direct contact. The multi-layer wire pre-product 25 is heat cured at heat curing station 35 to generate resultant wire 40. Unexpectedly, the resultant wire 40 has properties thought to be achievable only through e-beam manufacturing methods.

The exemplary process depicted in FIG. 1 is not generally limited by the materials selected for use as conductive cores 15. Also, except for melt temperatures, the exemplary process is similarly not limited by the particular cross-linking polymer selected for use as a receptor polymer 22 or by the polymer selected for use as a donor polymer 23.

Conductive Cores

"Conductive core", as used herein, refers to at least one material such as a metal or a metalloid having conductive or semi-conductive properties for use in a wire. A wide range of conductive cores 15 may be suitable for use with the methods and wires disclosed herein. That is, the conductive core 15 may have a range of chemical compositions, so long as the conductive core 15 conducts electricity sufficiently for the application. Suitable conductive cores 15, for example, may include a metal comprising at least one of copper, nickel silver, beryllium, phosphor bronze, nickel, aluminum, or steel. Additionally, metals may be plated with another metal-containing material. For example, tin-plating, silver-plating, gold-plating, or nickel-plating may be suitable for use with the methods and wires disclosed herein. Exemplary conductive materials may also include copper-clad aluminum and copper-clad steel.

In applications where the conductive core 15 is semi-conductive, conductive core 15 may include a range of suitable semi-conductive materials. Such materials may include, without limitation, silicon, graphite, germanium, antimony and gallium arsenide phosphide.

Conductive cores 15 may be configured in any of a wide range of arrangements. For example, the conductive core 15 may be solid (i.e., comprise a single strand of metal), or the conductive core 15 may be stranded. When the conductive core 15 is stranded, any number of strands may be used. For example, the number of strands can equal or exceed 6, 19, 37, 50, 154, 494, 741 or 1140 strands. The strands may all be of the same chemical composition, or different strands may have different chemical compositions. A wide range of configurations of strands may be suitable for the use with the methods and wires disclosed herein. For example, the strands say be woven or non-woven. Additionally, the conductive core 15 may comprise layers of strands upon one another. The configuration of adjacent layers of strands can be the same as or different from one another, whether woven or non-woven.

The conductive core 15 may have a cross-sectional area of a wide range of sizes. For example, cross-sectional areas of conductive core 15 may be as small as about 0.13, 0.22, or 0.35 mm$^2$. Additionally, cross-sectional areas of conductive core 15 may be as large as or larger than about 1, 2, 3, 4, 5 or 6 mm$^2$.

The conductive core 15 may have any set of properties desired for a particular application. For example, with respect to electrical properties, the conductive resistance of a conductive core 15 can be as low as about 0.1 mOhm/m at 20° C. or as high as about 130 mOhm/m at 20° C. In other words, properties such as electrical properties of conductive cores 15 do not limit the methods and wires disclosed herein.

Cross-Linkable Receptor Polymers

"Cross-linkable receptor polymers", as used herein, refers to polymers having a chemical structure such that the polymers are capable of cross-linking upon curing, the receptor polymers being substantially free of curing agent. "Substantially free", as used herein, encompasses the complete absence of curing agents, but also allows for incidental and/or trace amounts of curing agents to be detectable in the receptor polymer 22 using standard chemical analytical methods. Such incidental and/or trace amounts of curing agents should not comprise more than about 0.2% or more than about 1% by weight of the receptor polymer.

A wide range of cross-linkable polymers or cross-linkable polymer combinations may be suitable for use as a receptor polymer 22 so long as the receptor polymer 22 has a melt temperature higher than an extrusion temperature and higher than a melt temperature for a donor polymer 23. "Melt temperature", as used herein, refers to the temperature range when a polymer transitions from a crystalline or semi-crystalline phase to a viscous amorphous phase. "Extrusion temperature", as used herein, refers to the temperature at which resins in the extruder 20 exit the extruder 20 through a nozzle.

The difference in melt temperature between the receptor polymer 22 and the donor polymer 23 should be large enough to avoid scorching and small enough to generate a sufficient state of cure to confer desired properties upon the insulation of wire 40. The difference in melt temperature between the receptor polymer 22 and the donor polymer 23 may be at least about 5° C., at least about 10° C. at least about 20° C., or least about 40° C. The difference in melt temperature between the receptor polymer 22 and the donor polymer 23 may be greater or lower, depending upon the materials used for the receptor polymer 22 and the donor polymer 23 and the intended use of the wire 40.

To avoid scorching, melt temperatures for suitable receptor polymers 22 should be higher than the extrusion temperature. Exemplary melt temperatures for suitable receptor polymers 22 may be, on the low end, as low as or lower than about 125° C., about 135° C. or about 150° C. Exemplary melt temperatures for suitable receptor polymers 22 on the high end may be as high as or higher than about 200° C., about 250° C. or about 300° C. The range of suitable melt temperatures for receptor polymers 22 may vary depending upon the materials used for the receptor polymer 22 and the donor polymer 23 and the intended use of the wire 40.

Suitable cross-linkable receptor polymers 22 may include one or more of substituted or unsubstituted cross-linkable polyolefins such as polyethylene (including by way of non-limiting example, one or more of ultra high molecular weight polyethylene (UHMWPE) or high density polyethylene (HDPE)). Additional suitable receptor polymers 22 may include polyvinyl chloride (PVC), ethylene vinyl acetate (EVA) and cross-linking fluoropolymers. Suitable commercially available receptor polymers 22 may include PETROTHENE® HDPE from Lyondell, MARLEX® HDPE from Chevron Phillips Chemical Co., TEFLON® and TEFZEL® fluoropolymers from Dupont, or KYNAR® and KYNAR FLEX® fluoropolymers from Arkema.

Donor Polymers

"Donor Polymers", as used herein, refers to polymers having curing agent associated therewith to eventually migrate from the donor polymer 23 to the receptor polymer 22. A wide range of polymer or polymer combinations may be suitable for use as a donor polymer 23 so long as the donor polymer 23 has a melt temperature lower than the receptor polymer 22, as described above. Additionally, the donor polymer 23 may have a melt temperature at or below the extrusion temperature. To avoid premature migration of curing agent and scorching, melt temperatures for suitable donor polymers 22 should not be too far below the extrusion temperature. Exemplary melt temperatures for suitable donor polymers 23 may be, on the low end, as low as or lower than about 55° C., about 70° C. or about 80° C. Exemplary melt temperatures for suitable donor polymers 23 on the high end may be as high as or higher than about 100° C., about 115° C. or about 125° C. The range of suitable melt temperatures may vary depending upon the materials used for the receptor polymer 22 and the donor polymer 23 and the intended use of the wire 40.

Donor polymers 23 may be cross-linkable, but need not be cross-linkable. Suitable donor polymers 23 may include one or more of substituted or unsubstituted cross-linkable polyolefins such as polyethylene (including by way of non-limiting example, one or more of linear low-density polyethylene (LLDPE) or low-density polyethylene (LDPE)). Suitable donor polymers may also include ethylene-propylene copolymers (EPM), ethylene-propylene-diene (EPDM) elastomers, ethylene vinyl acetate (EVA) or ethylene-vinyl acetate copolymer (EVM). Suitable commercially available donor polymers 23 may include ELVAX® EVA from Dupont, LEVAPRENE® EVM from LANXESS, PETROTHENE® LDPE from Lyondell, BOREALIS® LDPE from Borealis AG, ROYALENE® EPDM from Lion Copolymer, NEOPRENE® synthetic rubber from Dupont, NORDEL IP® hydrocarbon rubber from The Dow Chemical Co., ENGAGE® polyolefin from The Dow Chemical Co., TAFMER® alpha-olefin copolymer from Mitsui Chemical, and TYRIN® chlorinated polyethylene resin from The Dow Chemical Co.

Donor polymers 23 must be associated with at least one curing agent. A wide range of curing agents may be used. For example, curing agents may include one or more peroxides. Exemplary peroxides may include diacyl peroxide, dalkyl peroxide, hydroperoxides, ketone peroxide, organic peroxide, peroxy(di)carbonate, peroxyester, and peroxyketal. Curing agents may also include, sulfur, amines, and diamines, or any combination thereof. Suitable commercially available curing agents may include DI-CUP®, LUPEROX LP®, LUPEROX 101®, LUPEROX 224®, VUL-CUP R® and VUL-CUP 40KE® peroxides from Arkema, VAROX DCP®, VAROX VC-R®, VAROX DBPH peroxides from Vanderbilt Co. Inc.

Coagents may optionally be included with one or more curing agents. A range of coagent may be used. Coagents may include, for example, one or more of di- or tri-functional acrylate or methacrylate, vinyl butadiene, vinyl butadiene-styrene copolymers. Coagents may optionally be included with the starting materials for the receptor polymer 22 or the donor polymer 23 or both.

The amount of curing agent associated with the donor polymer 23 should be enough so that sufficient curing agent migrates from the donor polymer 23 to the receptor polymer 22 during heat curing to cause sufficient cross-linking to confer the desired properties onto wire 40. Too little curing agent may lead to insufficient cross-linking, thereby generating wires that fail to satisfy technical specifications. Exemplary problems associated with insufficient curing or cross-linking may include swelling or cracking of wire insulation during manufacture or use.

By way of non-limiting example, for wires to be used in the automotive industry, too little curing agent may cause a wire 40 to fail one or more of the tests set forth in International Organization for Standardization (ISO) 6722 for road vehicles 60V and 600V single-core cables, which is incorporated by reference herein in its entirety. Among other tests, the ISO standards delineate a pressure test at high temperature, abrasion tests, heat aging tests, and tests for resistance to chemicals.

For the pressure test described in Section 7.1 of ISO 6722, wire samples are subjected to a load that is calculated as a function of the cross-sectional area of the conductive core of the wire (the outside diameter of the wire less the nominal thickness of the insulation in the wire), and heated for 4 hours in an oven. The temperature of the oven depends on the class of the wire being tested. For example, Class A rated wire would be heated to 85±2° C., whereas Class B rated wire would be heated to 100±2° C. The wire samples are then immersed in a salt water bath for 10 seconds, then subjected to 1 kV for 1 minute. If breakdown of the wire samples does not occur, then the wire samples pass the test.

There are two exemplary resistance-to-abrasion tests delineated in ISO 6722, a needle test (Section 9.3) and a sandpaper test (Section 9.2). For the needle test, a needle having a diameter of about 0.45± 0.01 mm may be selected to make abrasions of about 15.5±0.1 mm in length at a frequency of about 55±5 cycles per minute. An applied force of 7 N±0.mm$^2$ is exerted upon the sample wires. Suppliers and OEMs supplement the ISO standard by agreeing how many cycles of abrasion scrapes a wire having a conductive core of a particular cross-sectional area must endure while the insulation of the wire remains intact. For example, OEMs may require a supplier to manufacture a wire having a conductive core with a cross-sectional area of 1.5 mm$^2$ or greater, and require that the insulation of such a wire remain intact following at least 1500 cycles of abrasions. Similarly, OEMs may require a supplier to manufacture a wire having a conductive core with a cross-sectional area of about 0.22 mm$^2$ or less, and require that the insulation of such a wire remain intact following at least 150 cycles of abrasion scrapes. Other specifications are contemplated, such as wires having a conductive core with a cross-sectional area of about 0.35 mm$^2$ or about 0.5 mm$^2$, which are common wire sizes. For such wires, technical specifications may require insulation to withstand at least 200 or 300 cycles of abrasion scrapes, respectively.

For the ISO 6722 sandpaper test, 150 J garnet sandpaper is applied to sample wires at a rate of 100±75 mm/min with an applied force of at least 0.63 N. Depending upon the cross-sectional area of the conductive core, an additional mass of a pre-selected magniuude is added to the apparatus to apply additional force on the sample wires. The sandpaper is drawn across the wire until at least some of the conductive core is exposed. The length of the sandpaper required to expose the conductive core is recorded as the measure of resistance to sandpaper abrasion. The ISO 6722 standard increases the length of sandpaper required to pass the test with the cross-sectional area of the conductive core of the sample wires. For example, a 60V thin wall wire for smaller gauge wires would require testing with an additional mass of 100 g, and the length of the sandpaper making the abrasion on the sample wire without exposing the conductive core would be 200 mm in length for a conductive core having a cross-sectional area of 0.13 mm$^2$, 224 mm in length for a conductive core having a cross-sectional area of 0.22 mm$^2$, and 250 mm in length for a conductive core having a cross-sectional area of 0.35 mm$^2$. By comparison, a 60V thin wall wire for larger gauge wires would require testing with an additional mass of 200 g, and the length of sandpaper making the abrasion on the sample wire without exposing the conductive core would be 300 mm in length for a conductive core having a cross-sectional area of 0.5 mm$^2$, 450 mm in length for a conductive core having a cross-sectional area of 1.5 mm$^2$, and 500 mm in length for a conductive core having a cross-sectional area of 2.0 mm$^2$.

Heat aging tests are described in Section 10 of ISO 6722. For example, for long term aging, sample wires are placed in an oven for 3000 hours. The temperature depends upon the class rating of the sample wires. For example, class C wire is heated at 125±2° C. and class D wire is heated at 150±2° C. This simulates aging. After simulated aging, the sample wires are cooled at room temperature for at least about 16 hours, then the wires are wound into a winding. If any of the conductive core is exposed in the winding (that is, if the insulation cracks), then the sample wire fails the test. If not, the sample wire is immersed in a salt water bath for 10 minutes, then subjected to 1 kV for 1 minute. If breakdown of the sample wires does not occur, then the sample wires pass the test.

Resistance-to-chemicals tests are described in Section 11 of ISO 6722. For example, for resistance to hot water, closely wound sample wires of a specified length are immersed in a salt water bath at 185±5° C. for 7 days, which completes one cycle. After five cycles, the sample wires are cooled, visually inspected, then subjected to 1 kV for 1 minute. If there is no cracking on the insulation, the sample wires pass the visual inspection. If breakdown of the sample wires does not occur, then the sample wires pass the test.

Unexpectedly, wires 40 manufactured by the methods disclosed herein passed the battery of tests disclosed in ISO 6722 with cross-linked insulation of the wires 40 having a state of cure as low as 50%. Generally, to pass a battery of tests such as those described above and detailed in ISO 6722, sufficient curing agent should be associated with the donor polymer 23 to ensure a state of cure of at least about 50% of the receptor polymer 22 collectively with any and all other insulative cross-linkable polymers in the wire 40. There may be instances where technical specifications can be satisfied with an even lower state of cure. Additionally, there may be instances where a state of cure of at least about 75% is desired to satisfy particular technical specifications. On the low end, curing agents may comprise about 0.25% by weight of the polymer or polymers comprising the receptor polymer 22 together with any other cross-linkable polymers in the wire 40, but weigh percentages may be about 0.5%, about 1.0%, 2.0% or about 3.5% of the total cross-linkable starting materials. Depending upon the particular application for the wire 40 and technical specifications placed upon the wire 40 to be manufactured, less or more curing agent may be added than the specific ranges exemplified herein.

Optional Materials

Except for the issues specific to curing agents as described herein, a wide range of additional ingredients may be placed in the extruder 20 to be extruded with the receptor polymer 22 or the donor polymer 23. Such ingredients may include, by way of non-limiting example, monomers, oligomers or polymers to form one or more thermoplastic polymer insulative layers, fire retardants, processing aids, antioxidants, thermal stabilizers, elastomers, reinforcing fillers, antiozonants, accelerants, vulcanization agents, crack inhibitors, metal oxides and pigments.

Multi-Layer Wire Pre-Product

In multi-layer wire pre-product 25, receptor polymers 22 and donor polymers 23 may be disposed in any layer configuration so long as the receptor polymer 22 is between the conductive core 15 and the donor polymer 23. The receptor polymer 22 and the donor polymer 23 need not be in direct contact with one another or with the conductive core 15.

Figure 4:
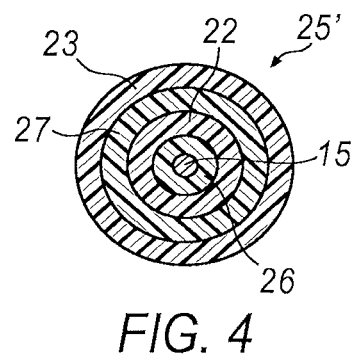
FIG. 4 shows a cross-section of an exemplary multi-layer wire pre-product.

Referring to FIGS. 3 and 4, exemplary configurations of insulative layers comprising receptor polymers 22 and donor polymers 23 are depicted. In FIG. 3, an exemplary multi-layer pre-product 25 is shown. Receptor polymer 22 is in direct contact with conductive core 15, and donor polymer 23 is in direct contact with the receptor polymer 22. In FIG. 4, an exemplary multi-layer pre-product 25' is shown. Insulative layer 26 is disposed between the conductive core 15 and the receptor polymer 22, and insulative layer 27 is disposed between the receptor polymer 22 and the donor polymer 23. Insulative layers 26 and 27 may be the same or different, and may comprise any of a wide range of polymer or polymers, whether or not cross-linking. Additional polymer layers may optionally be disposed over at least a portion of the donor polymer 23 as well.

Insulative layers, including the donor polymer 23 and the receptor polymer 22, may have any of a wide range of dimensions, individually or collectively. For example, with respect to the collective thickness of the insulative layers, at least thick wall, thin wall, ultra thin wall, and ultra ultra thin wall wires 40 may be manufactured according to the methods disclosed herein. Exemplary thicknesses of collective insulative layers may range from about 0.16 mm to about 1.28 mm. The thickness ratio of donor polymer 23 to receptor polymer 22 may vary. If the receptor polymer 22 is more expensive, it may be advantageous to use just enough receptor polymer 22 to satisfy technical specifications for the particular wire 40 being manufactured. Exemplary thickness ratios (by volume) of receptor polymer 22 to donor polymer 23 may be about 1:1, about 1:1.5, about 1:2 or about 1:5. The low end of this range may have more direct application to smaller gauge wires such as automotive ignition wires, and the high end of this range may have more direct application to larger gauge wires, for example, battery wires. Depending upon the technical specifications for resultant wire 40, thickness ratios may be lower or higher than the specific ranges exemplified herein.

Insulative layers, including the layers comprising donor polymer 23 and the receptor polymer 22, may have a wide range of properties, including electrical properties, individually or collectively. For example, an average dielectric constant for the collective insulative layers made using the methods disclosed herein may be as lower as or lower than about 1.2, and the dielectric constant may be as high as or higher than about 7.

Insulative layers other than the layers comprising donor polymer 23 and the receptor polymer 22 may comprise a broad range of materials. For example, it is contemplated that tapes, separators, foils, shields and braids made from a broad cross-section of materials may be included as insulative layers. Such insulative layers may reside between the conductive core 15 and the layer comprising receptor polymer 22, between the receptor polymer 22 and the donor polymer 23, and/or outside the donor polymer 23.

Manufacturing Methods

A wide range of manufacturing methods may be used to create a multi-layer wire pre-product 25 and ultimately resultant wire 40. Referring to FIG. 1, co-extrusion is shown as an exemplary manufacturing method to create a multi-layer wire pre-product 25 comprising an insulative layer including a receptor polymer 22 and comprising an insulative layer including a donor polymer 23. A conductive core 15 is fed into an extruder 20. Monomers, oligomers or polymers to form a cross-linkable receptor polymer 22 are added to a hopper of the extruder 20. No curing agent is added. Separately, monomers, oligomers or polymers to form a donor polymer 23 are added to a different hopper of the extruder 20. In this example, curing agent to be associated with the donor polymer 23 is included in the hopper with the starting materials to form the donor polymer 23 and any other starting materials. A receptor polymer 22 is co-extruded with a donor polymer 23, the donor polymer 23 being associated with a curing agent by being extruded with the curing agent. A multi-layer wire pre-product 25 is generated from the co-extrusion process where a donor polymer 23 is disposed about the receptor polymer 22, which is in turn disposed about the conductive core 15.

Figure 2:
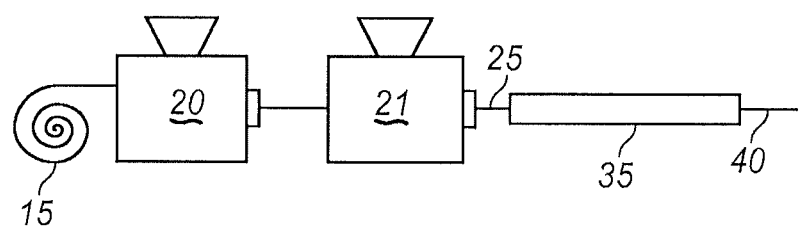
FIG. 2 illustrates an exemplary method of manufacturing wire.

Referring to FIG. 2, serial extrusion, also referred to as tandem extrusion, is shown as an exemplary manufacturing method to create a multi-layer wire pre-product 25. Two extruders are used, extruder 20 and extruder 21. Extruder 20 accepts a feed of conductive core 15, and accepts starting materials into a hopper to extrude, at least, a receptor polymer 22 about the conductive core 15. No curing agent is added. The product of extruder 20 is fed to extruder 21. In the example of FIG. 2, the starting materials to form donor polymer 23 are added to the hopper with a curing agent to be associated with the donor polymer 23 by being processed in the extruder 20 together with donor polymer 23. A multi-layer wire pre-product 25 is generated from the serial extrusion where a donor polymer 23 is disposed about the receptor polymer 22, which is in turn disposed about the conductive core 15.

Additional manufacturing methods are contemplated to generate the multi-layer wire pre-product 25. For example, a receptor polymer 22 may be extruded about a conductive core 15 in a completely separate process from the extrusion of a donor polymer 23, and the layers are brought together manually or by other methods, including manual labor, prior to heat curing.

If a receptor polymer 22 is extruded in a separate process from the extrusion of the donor polymer 23, then the extrusion temperature for the receptor polymer 22, substantially free of curing agent, is not limited to those temperatures below a cure temperature for a particular cross-linkable polymer and curing agent combination. Extrusion temperatures below the cure temperatures may still be used, but higher extrusion temperatures may be useful for, for example, increasing manufacturing line speeds. By way of non-limiting example, extrusion temperatures for a receptor polymer 22 can be as high or higher than about 125° C., about 200° C., or about 300° C.

If receptor polymer 22 and donor polymer 23 are co-extruded, times and temperatures for extrusion should be set to minimize migration of curing agents from the donor polymer 23 to the receptor polymer 22 during extrusion to avoid scorching. The temperature may depend upon the materials selected for the donor polymer 23 and the receptor polymer 22. Typical extrusion temperatures are less than about 125° C., less than about 100° C., or less than about 80° C. The time of extrusion should maximize line speed without sacrificing the desired properties in resultant wire 40 below technical specifications.

Depending upon the particular method of manufacturing multi-layer wire pre-product 25 selected, different extruders 20 may be selected. Single hopper and dual hopper extruders may be used. New and used exemplary extruders 20 are commercially available from many sources, including but not limited to Davis Standard or Progressive Machinery, Inc.

Referring to FIGS. 1 and 2, after the multi-layer wire pre-product 25 has been formed, it is heat cured at curing station 35, which may comprise a steam cure station. As the multi-layer pre-product 25 is run through the heat curing station 35, the donor polymer 23 begins to melt. Then, curing agent in the donor polymer 23 migrates from the donor polymer 23, through any intermittent layers, and into the receptor polymer 22. The cross-linking reaction commences in, at least, the receptor polymer 22. The cross-linking of any other cross-linkable polymers also occurs during curing. Collectively, the insulative layers about the conductive core 15 are the insulation of resultant wire 40. The state of cure of the insulation of resultant wire 40 will depend, in part, on the time and temperature of cure.

Again, faster line speeds are generally more commercially desirable than slower line speeds, so high cure temperatures and short cure times may be used so long as the time and temperature for cure permit sufficient cross-linking so that insulation of the resultant wire 40 may satisfy technical specifications. Typical cure times may range anywhere from about 20 seconds or 30 seconds to about 2 minutes to about 5 minutes to about 10 minutes. Typical cure temperatures may be as low as about 130° C. or about 140° C., and may be as high as about 170° C., about 180° C. or about 200° C. The technical specifications for the resultant wire 40 drive the cure times and the cure temperatures. Thus, it is contemplated that both cure times and cure temperatures may be higher or lower than the exemplary ranges disclosed herein.

A wide range of equipment and methods of heat curing may be used. Such equipment may include Davis Standard steam tube cure equipment. It is contemplated that the heat curing need not be applied heat from an external source. That is, the heat that initiates curing may be generated from an exothermic reaction in the materials. Any commercially reasonable manufacturing line speed can be selected for use herein. Typical manufacturing line speeds may be from about 300 m/min to about 1250 m/min Unexpectedly, when manufacturing line speeds were as high as about 900 m/min or higher, and the degree of cross-linking in the insulative layer including the receptor polymer 22 was less than 75%, the resultant wires 40 made by the methods disclosed herein were exceptionally resistant to scrape abrasion and passed the tests set forth in ISO 6722 set forth above.

Example 1

Figure 5:
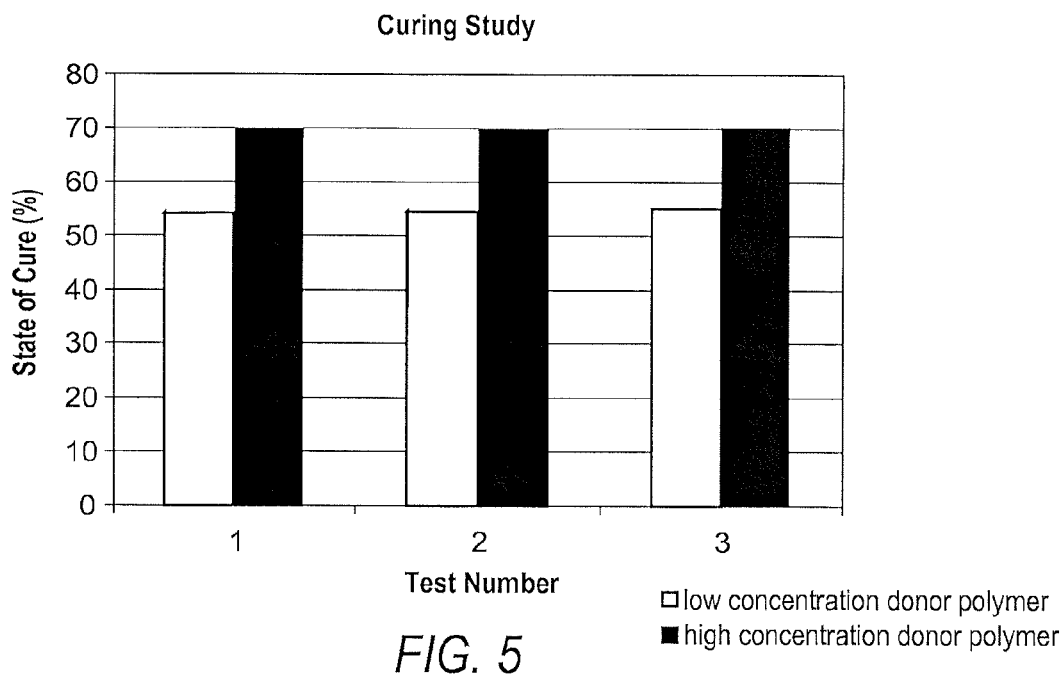
FIG. 5 graphically depicts cure completion testing results of exemplary wire.

Copper wire was fed to a Davis Standard extruder, and PETROTHENE® HDPE was added to the hopper. The wire feed had a cross sectional area of about 0.5 mm². The HDPE was extruded at 200±5° C. for 120 minutes and collected for use as a receptor polymer for wire samples to be prepared. A first sample of PETROTHENE® LDPE comprising 0.5 wt % of VULCUP R® curing agent was extruded for use as a low concentration donor polymer. A second sample of PETROTHENE® LDPE comprising 1.5 wt % of VULCUP R® curing agent was extruded for use as a high concentration donor polymer. The receptor polymer was inserted into the low concentration donor polymer and cured at 200±5° C. for about 1.5 minutes. Three cured samples were collected and tested for state of cure by ASTM D2765 solvent extraction. In each instance, a state of cure of greater than 50% was achieved. Additional receptor polymer samples were inserted into high concentration donor polymer cured at 200±5° C. for about 1.5 min. Three cured wire samples were collected and tested for state of cure by ASTM D2765 solvent extraction. In each instance, a state of cure of about 70% was achieved. The results are graphically depicted in FIG. 5.

Example 2

Figure 6:
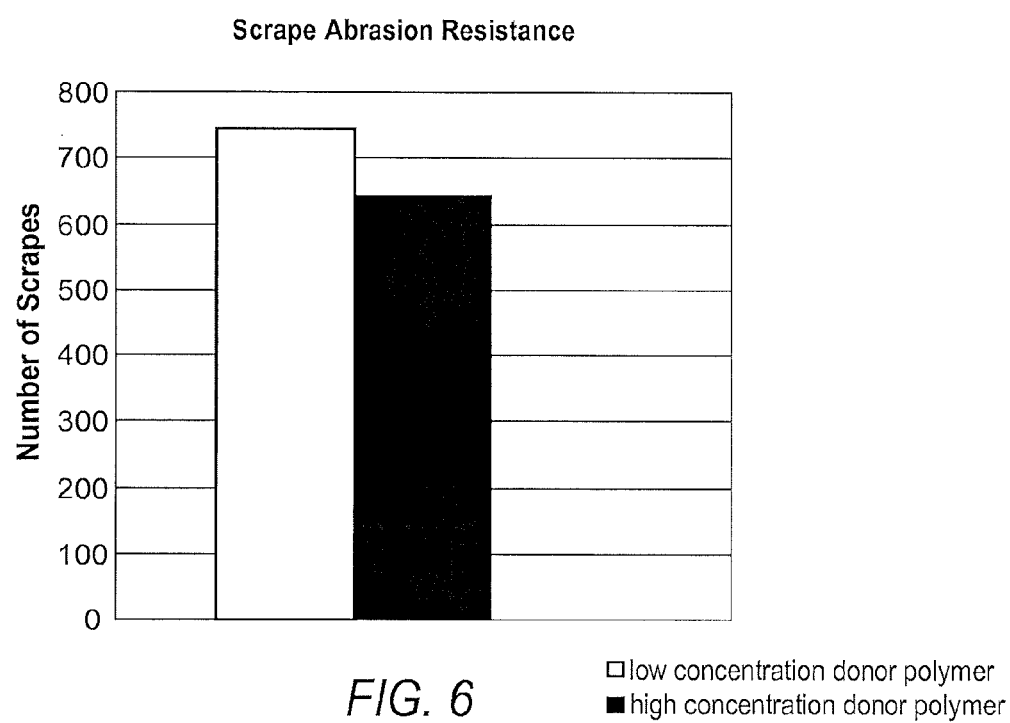
FIG. 6 graphically depicts scrape abrasion testing results of exemplary wire.

A cured wire with a low concentration donor polymer produced in Example 1 was tested for scrape abrasion. Similarly, a cured wire with a high concentration donor polymer produced in Example 1 was tested for scrape abrasion. The collective insulative layers of the cured wire made with the low concentration donor polymer remained in tact following over 700 cycles of abrasion scrapes with a needle having a diameter of 0.45±0.01 mm. The collective insulative layers of the cured wire made with the low concentration donor polymer remained in tact following over 600 cycles of abrasion scrapes with a needle having a diameter of 0.45±0.01 mm. Unexpectedly, both heat-cured samples exceeded a technical requirement that the insulative layer or layers above a conductive core remain in tact following at over 600 cycles of abrasion scrapes with a needle having a diameter of 0.45±0.01 mm. The results are graphically depicted in FIG. 6.

Example 3

Copper wire was fed to a Davis Standard extruder, and PETROTHENE® HDPE was added to the hopper. The wire feed had a cross sectional area of about 0.35 mm². The HDPE was extruded at 200±5° C. for 60 minutes and collected for use as a receptor polymer for wire samples to be prepared. BOREALIS® Polyethylene LDPE comprising 1.5 wt % of VULCUP R® curing agent was extruded for use as a low concentration donor polymer at 100° C. for 20 min. The extruded HDPE was inserted into the extruded LDPE prior to steam cure. Cure temperatures were set to 200±5° C. In one trial, line speeds were set at about 98 m/min. In a second trial, line speeds were set at about 457 m/min. In the first trial, the state of cure was determined to be greater than 73%, and the scrape abrasion resistance was determined to be greater than 250 needle scrapes. In the second trial, the state of cure was determined to be greater than 60%, and the scrape abrasion resistance was determined to be greater than 250 needle scrapes. Unexpectedly, across the range of line speeds, the cured wire exceed the technical requirements of an ability to withstand 200 cycles of abrasion scrapes with a needle having a diameter of 0.45±0.01 mm.

Example 4

Copper wire was fed to a Davis Standard extruder, and PETROTHENE® HDPE was added to the hopper. The wire feed had a cross sectional area of about 0.5 mm². The HDPE was extruded at 200±5° C. for 60 minutes and collected for use as a receptor polymer for wire samples to be prepared. BOREALIS® Polyethylene LDPE comprising 1.5 wt % of VULCUP R® curing agent was extruded for use as a low concentration donor polymer at 100±5° C. for 20 minutes. The extruded HDPE was inserted into the extruded LDPE prior to steam cure. Cure temperatures were set to 200±5° C. In one trial, line speeds were set at about 98 m/min. In a second trial, line speeds were set at about 457 m/min. In the first trial, the state of cure was determined to be greater than 65%, and the scrape abrasion resistance was determined to be greater than 700 needle scrapes. In the second trial, the state of cure was determined to be greater than 53%, and the scrape abrasion resistance was determined to be greater than 700 needle scrapes. Unexpectedly, across the range of line speeds, the cured wire exceed the technical requirements of an ability to withstand 300 cycles of abrasion scrapes with a needle having a diameter of 0.45±0.01 mm.

Example 5

Copper wire was fed to a Davis Standard extruder, and PETROTHENE® HDPE was added to the hopper. The wire feed had a cross sectional area of about 1.0 mm². The HDPE was extruded at 200±5° C. for 60 minutes and collected for use as a receptor polymer for wire samples to be prepared. BOREALIS® Polyethylene LDPE comprising 1.5 wt % of VULCUP R® curing agent was extruded for use as a low concentration donor polymer at 100±5° C. for 20 minutes. The extruded HDPE was inserted into the extruded LDPE prior to steam cure. Cure temperatures were set to 200±5° C. In one trial, line speeds were set at about 98 m/min. In a second trial, line speeds were set at about 457 m/min. In the first trial, the state of cure was determined to be greater than 64%, and the scrape abrasion resistance was determined to be greater than 800 needle scrapes. In the second trial, the state of cure was determined to be greater than 62%, and the scrape abrasion resistance was determined to be greater than 800 needle scrapes. Unexpectedly, across the range of line speeds, the cured wire exceed the technical requirements of an ability to withstand 500 cycles of abrasion scrapes with a needle having a diameter of 0.45±0.01 mm.

Example 6

Copper wire was fed to a Davis Standard extruder, and PETROTHENE® HDPE was added to the hopper. The wire feed had a cross sectional area of about 1.5 mm². The HDPE was extruded at 200±5° C. for 60 minutes and collected for use as a receptor polymer for wire samples to be prepared. BOREALIS® Polyethylene LDPE comprising 1.5 wt % of VULCUP R® curing agent was extruded for use as a low concentration donor polymer at 100±5° C. for 20 minutes. The extruded HDPE was inserted into the extruded LDPE prior to steam cure. Cure temperatures were set to 200±5° C. In one trial, line speeds were set at about 98 m/min. In a second trial, line speeds were set at about 457 m/min. In the first trial, the state of cure was determined to be greater than 66%, and the scrape abrasion resistance was determined to be greater than 3000 needle scrapes. In the second trial, the state of cure was determined to be greater than 60%, and the scrape abrasion resistance was determined to be greater than 3000 needles scrapes. Unexpectedly, across the range of line speeds, the cured wire exceed the technical requirements of an ability to withstand 1500 cycles of abrasion scrapes with a needle having a diameter of 0.45±0.01 mm.

Example 7

Figure 7:
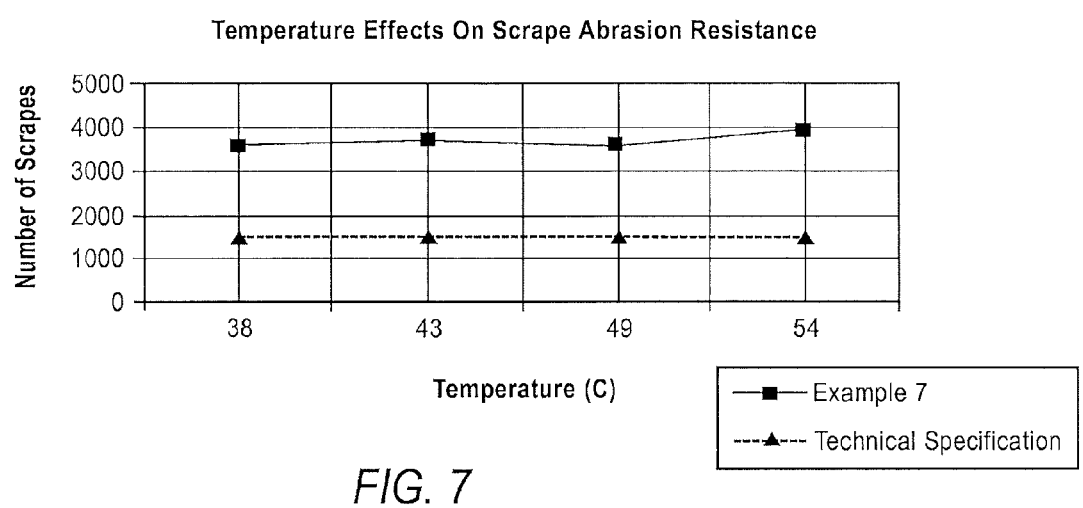
FIG. 7 graphically depicts scrape abrasion testing results of exemplary wire.

Copper wire was fed to a Davis Standard extruder. The wire feed had a cross sectional area of about 1.5 mm². PETROTHENE® HDPE was added to the hopper and was extruded at 200° C. for 60 minutes then collected for use as a receptor polymer. BOREALIS® Polyethylene LDPE containing 1.5% by weight of VULCUP R® curing agent was extruded at 100±5° C. for 20 minutes and collected for use as a low concentration donor polymer. The extruded HDPE was inserted into the extruded LDPE prior to steam cure. Cure temperatures were set to 200±5° C. Each of the samples was tested or scrape abrasion with a needle having a diameter of 0.45±0.01 mm. The tests were run at 38° C., 43° C., 49° C. and 54° C. Unexpectedly, the collective insulative layers comprising both the donor and the receptor polymer remained in tact after more than 3400 scrapes. Also unexpectedly, the performance remained substantially constant over the tested temperature range. The results are graphically depicted in FIG. 7.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of manufacturing a wire, comprising:
   extruding a cross-linkable receptor polymer, substantially free of curing agent, about a conductive core;
   extruding a donor polymer, wherein the donor polymer comprises a curing agent;
   disposing the extruded donor polymer about the receptor polymer, thereby forming a multi-layer wire pre-product, wherein the donor polymer has a melt temperature lower than a melt temperature of the receptor polymer; and
   heat curing the multi-layer wire pre-product, wherein heat curing comprises:
      subjecting the multi-layer pre-product to a heat curing station operating at a cure temperature from about 130° C. to about 200° C.; and
      melting the donor polymer, such that the curing agent in the donor polymer migrates from the donor polymer to the receptor polymer;
   wherein the thickness of the receptor polymer to the thickness of the donor polymer is about 1:1 to about 1:5.

2. The method of claim 1, wherein extruding the receptor polymer comprises disposing the receptor polymer in direct contact with the conductive core.

3. The method of claim 1, wherein the conductive core comprises a semi-conductive material.

4. The method of claim 1, wherein the conductive core comprises at least one of solid or stranded copper, nickel silver, beryllium, phosphor bronze, nickel, copper-clad aluminum, copper-clad steel, aluminium and steel.

5. The method of claim 1, wherein the donor polymer has a melt temperature lower than a melt temperature of the receptor polymer by at least about 5° C.

6. The method of claim 1, wherein disposing the donor polymer about the receptor polymer comprises co-extruding the receptor polymer and the donor polymer.

7. The method of claim 1, wherein disposing the donor polymer about the receptor polymer comprises serially extruding the receptor polymer and the donor polymer.

8. The method of claim 1, wherein disposing the donor polymer about the receptor polymer comprises placing the donor polymer in direct contact with the receptor polymer.

9. The method of claim 1, wherein the conductive core has a cross-sectional area of at least about 1.5 mm² and wherein heat curing comprises subjecting the multi-layer wire pre-product to a heightened temperature for time sufficient to form a wire including insulation capable of remaining intact following at least 1500 cycles of abrasion scrapes with a needle having a diameter of about 0.45±0.01 mm.

10. The method of claim 1, wherein the conductive core has a cross-sectional area of not greater than 0.22 mm² and wherein heat curing comprises subjecting the multi-layer wire pre-product to a heightened temperature for time sufficient to form a wire including insulation capable of remaining intact following at least 150 cycles of abrasion scrapes with a needle having a diameter of about 0.45±0.01 mm.

11. The method of claim 10, wherein the time sufficient is at least about 20 seconds.

12. The method of claim 1, wherein the conductive core has a cross-sectional area of no more than about 0.22 mm² and wherein heat curing comprises subjecting the multi-layer wire pre-product to a heightened temperature for time sufficient to form a wire including insulation capable of remaining intact following an abrasion scrape with a 150 J garnet sandpaper having a length of about 200 mm that is exerted with an applied force of at least about 0.63 N.

* * * * *